(12) United States Patent
Kirchmeier et al.

(10) Patent No.: US 10,374,923 B2
(45) Date of Patent: Aug. 6, 2019

(54) VEHICLE HAVING AN ETHERNET BUS SYSTEM AND METHOD FOR OPERATING SUCH A BUS SYSTEM

(71) Applicant: Bayerische Motoren Werke Aktiengesellschaft, Munich (DE)

(72) Inventors: Thomas Kirchmeier, Odelzhausen (DE); Christoph Schmutzler, Munich (DE); Thomas Koenigseder, Wilfling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 15/158,690

(22) Filed: May 19, 2016

(65) Prior Publication Data

US 2016/0269225 A1   Sep. 15, 2016

Related U.S. Application Data

(63) Continuation of application No. PCT/EP2014/074452, filed on Nov. 13, 2014.

(30) Foreign Application Priority Data

Nov. 20, 2013   (DE) .................... 10 2013 223 704

(51) Int. Cl.
*H04L 12/26* (2006.01)
*H04L 12/413* (2006.01)
(Continued)

(52) U.S. Cl.
CPC ............ *H04L 43/0817* (2013.01); *G09C 1/00* (2013.01); *H04L 12/40* (2013.01); *H04L 12/413* (2013.01);
(Continued)

(58) Field of Classification Search
CPC .................................................. H04L 43/0817
See application file for complete search history.

(56) References Cited

U.S. PATENT DOCUMENTS 7,440,530 B1 * 10/2008 Ballantyne .......... G06F 13/4045
340/870.01
2003/0009271 A1   1/2003 Akiyama
(Continued)

FOREIGN PATENT DOCUMENTS

DE   10 2004 005 680 A1   8/2005
DE   10 2006 051 444 A1   5/2008
(Continued)

OTHER PUBLICATIONS

Kern, A., et al., "Testing Switched Ethernet Networks in Automotive Embedded Systems", IEEE, Jun. 15, 2011, pp. 150-155, XP031893708 (Six (6) pages).
(Continued)

*Primary Examiner* — Jason E Mattis
(74) *Attorney, Agent, or Firm* — Crowell & Moring LLP

(57) ABSTRACT

A vehicle has a bus system, which is formed as an Ethernet bus system and has at least one distributor device with multiple port connections, to which a bus participant is respectively connected, which, via the associated port connection during the operation of the bus system, transmits data to the distributor device and/or receives data from the distributor device. The at least one distributor device is designed to carry out a diagnosis with respect to at least one of the port connections during operation of the bus system and to provide diagnostic data with respect to the at least one port connection.

17 Claims, 1 Drawing Sheet

(51) Int. Cl.
*G09C 1/00* (2006.01)
*H04L 12/40* (2006.01)
*H04L 12/24* (2006.01)
*H04L 29/08* (2006.01)

(52) U.S. Cl.
CPC .......... *H04L 41/0677* (2013.01); *H04L 67/12* (2013.01); *H04L 43/0847* (2013.01); *H04L 2012/40215* (2013.01); *H04L 2209/84* (2013.01)

(56) References Cited

U.S. PATENT DOCUMENTS

| | | | |
|---|---|---|---|
| 2004/0153870 A1 | 8/2004 | Konz et al. | |
| 2005/0015487 A1 | 1/2005 | Motoyama et al. | |
| 2005/0276225 A1* | 12/2005 | Mezer | H04L 41/26 370/241 |
| 2007/0032916 A1 | 2/2007 | Mark | |
| 2008/0140874 A1 | 6/2008 | Endl et al. | |
| 2008/0175159 A1* | 7/2008 | Caveney | H04L 43/0811 370/248 |
| 2009/0183038 A1* | 7/2009 | Andreoletti | H04L 1/20 714/708 |
| 2012/0124427 A1 | 5/2012 | Haug | |
| 2012/0218896 A1* | 8/2012 | Ygberg | H04L 41/0816 370/235 |
| 2012/0250518 A1 | 10/2012 | Diab | |
| 2013/0070613 A1* | 3/2013 | Deb | H04L 43/50 370/242 |
| 2014/0023068 A1* | 1/2014 | Kim | H04L 45/72 370/355 |
| 2014/0078889 A1* | 3/2014 | Diab | H04L 67/327 370/221 |
| 2015/0351137 A1* | 12/2015 | Neff | G07C 5/0808 370/329 |
| 2016/0182341 A1* | 6/2016 | Fischer | B60W 50/0205 370/251 |

FOREIGN PATENT DOCUMENTS

| | | |
|---|---|---|
| DE | 10 2009 026 807 A1 | 12/2010 |
| DE | 10 2009 057 773 A1 | 6/2011 |
| WO | WO 2008/095511 A1 | 8/2008 |

OTHER PUBLICATIONS

International Search Report (PCT/ISA/210) issued in PCT Application No. PCT/EP2014/074452 dated Feb. 5, 2015, with English translation (six (6) pages).
German Search Report issued in counterpart German Application No. 10 2013 223 704.9 dated Oct. 16, 2014, with partial English translation (eleven (11) pages).
Mathias Johanson et al., "Remote Vehicle Diagnostics over the Internet using the DoIP Protocol", ICSNC 2011: The Sixth International Conference on Systems and Networks Communications, 2011, pp. 226-231.
Robert. S, et al., "TCP/IP Stack Implementation for Communication over IP with AUTOSAR Ethernet Specification", International Journal of Engineering and Innovative Technology (IJEIT), vol. 3, Issue 1, Jul. 2013, pp. 176-179.

* cited by examiner

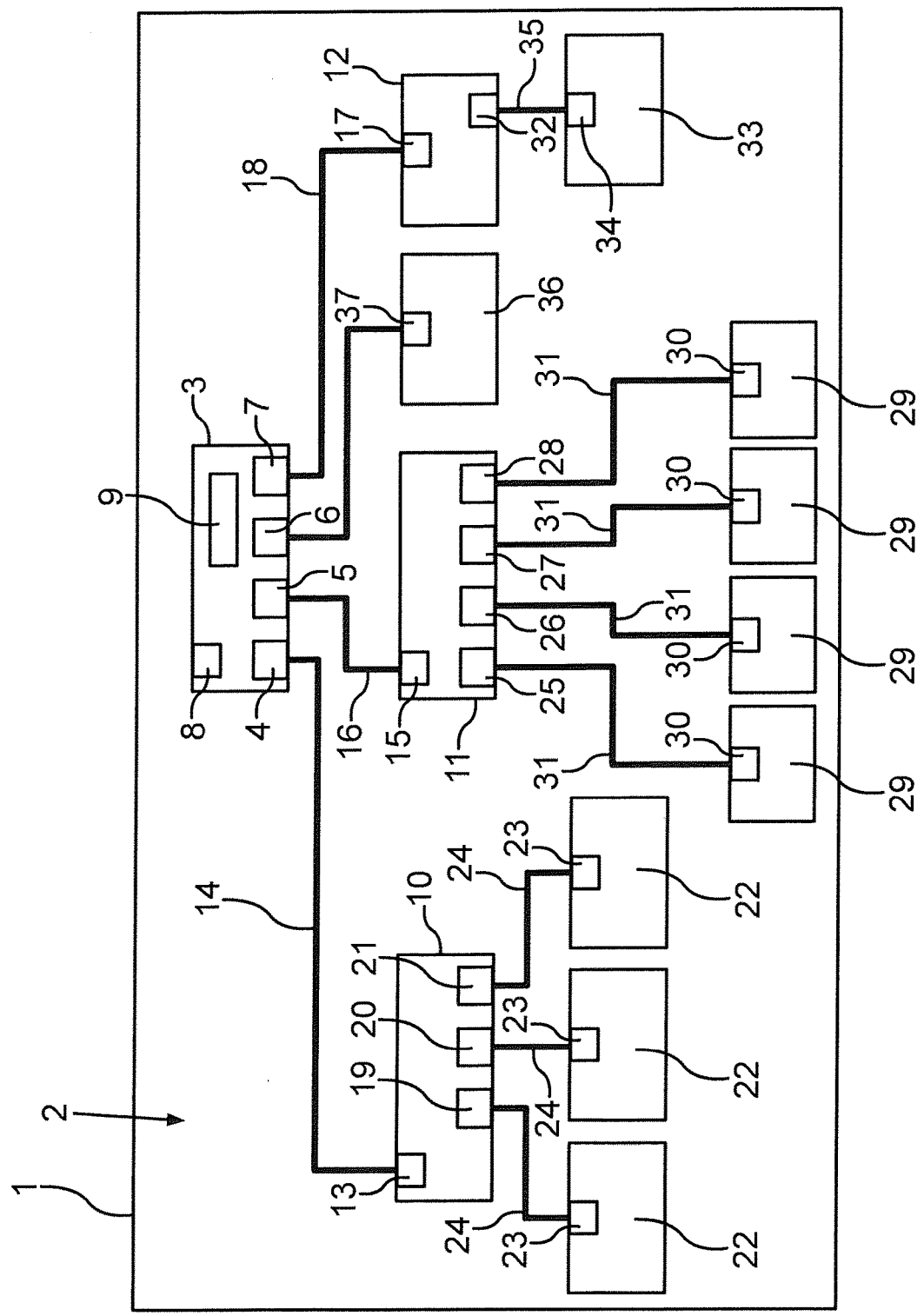

VEHICLE HAVING AN ETHERNET BUS SYSTEM AND METHOD FOR OPERATING SUCH A BUS SYSTEM

CROSS REFERENCE TO RELATED APPLICATIONS

This application is a continuation of PCT International Application No. PCT/EP2014/074452, filed Nov. 13, 2014, which claims priority under 35 U.S.C. § 119 from German Patent Application No. 10 2013 223 704.9, filed Nov. 20, 2013, the entire disclosures of which are herein expressly incorporated by reference.

BACKGROUND AND SUMMARY OF THE INVENTION

The invention relates to a vehicle having a bus system, which is designed as an Ethernet bus system and has at least one distributor device having a multiplicity of port connections, to which one bus participant respectively is connected. By way of the assigned port connection, during the operation of the bus system, the bus participant transmits data to the distributor device and/or receives data from the distributor device. In addition, the invention relates to a method of operating an Ethernet bus system in a vehicle.

Numerous bus system designs for motor vehicles are known from the state of the art. Today's motor vehicles are usually equipped with the so-called CAN (Controller Area Network) bus, which was developed specifically for the rapid serial data exchange between electronic control devices in motor vehicles. Furthermore, LIN (Local Interconnect Network) bus systems are also known, which also represent serial communication systems, but were developed specifically for more cost-effective communication of intelligent sensors and actuators in motor vehicles.

In the present case, an Ethernet bus system is of interest which can be used as an alternative or in addition to the CAN bus. The Ethernet bus system was at first used particularly for camera-based driver assistance systems. However, the newest trend aims at also mutually coupling other control devices and function features of a motor vehicle by way of an Ethernet network with respect to communication.

A bus system for a motor vehicle is known, for example, from International Patent Document WO 2008/095511 A1. The bus system includes several control devices as bus participants. For providing a bus system that is more flexible with respect to a fault diagnosis of the bus participants, it is suggested here that a gateway with an Ethernet interface be used, by way of which an external diagnostic device can be connected to the bus system. The gateway can be switched to a special diagnostic mode, in which—in contrast to the normal operating mode—under the control of the gateway, a bus message is transmitted to one of the bus participants, which corresponds to a message that this bus participant receives also during a regular operation of the motor vehicle. Although this permits a reliable and precise diagnosis of the bus participants, a special external diagnostic device will be required in this case. This state of the art therefore has a disadvantage in that the diagnosis can be carried out only in very specific situations, for example, only in a workshop.

It is an object of the invention to provide a method, as to how, in the case of a vehicle of the initially mentioned type, the expenditures of a diagnosis of the bus system can be reduced in comparison to the state of the art.

This and other objects are achieved by a vehicle as well as by a method in accordance with embodiments of the invention A vehicle according to the invention, particularly a motor vehicle, comprises a bus system, which is designed as an Ethernet bus system and comprises as least one distributor device—such as a switch and/or a gateway—, which has a multiplicity of port connections, which represent the physical ports of the distributor device. One bus participant respectively is connected to the port connections. The bus participant, by way of the assigned port connection, during the operation of the bus system, transmits data to the distributor device and/or receives data from the distributor device. The at least one distributor device is designed for carrying out, during the operation of the bus system and therefore during the operation of the vehicle, a diagnosis with respect to at least one of the port connections and, in the process, providing diagnosis data with respect to the at least one port connection.

In contrast to the state of the art according to International Patent Document WO 2008/095511 A1, the diagnosis of the bus system according to the invention is not, or not only, carried out in a special diagnostic mode but rather during the normal or regular operation of the vehicle, during which regular application data between the distributor device, on the one hand, and the bus participants, on the other hand, are transmitted. In this case, the invention utilizes the fact that, in the case of an Ethernet bus system—in contrast to, for example, CAN buses or FlexRay buses—it is basically possible to create an "intelligent infrastructure" by the corresponding design of the distributor device. By way of the intelligent infrastructure, during the running time of the bus system, the exact network condition can be determined, faults can be located and predicted and, as required, can also be corrected. In order to be able to carry out the diagnosis, the distributor device may be equipped with corresponding software, which has no effect on the application level as well as on the bus participants themselves. The diagnosis can correspondingly be carried out in parallel and thereby in the background of the normal operation of the bus participants and of the distributor device. As a result, basically no external diagnostic devices are required, and the diagnostic data can be collected during the operation of the vehicle and, in this case, for example, stored in a central diagnostic memory.

The Ethernet bus system is represented by a LAN network of the vehicle, which permits the data exchange between the distributor device and the bus participants in the form of data frames or so-called data packets. The data exchange takes place according to the Ethernet protocol.

As indicated above, by means of the at least one distributor device, a diagnosis is carried out with respect to at least one of the port connections. In this context, different embodiments may be provided depending on which components of the bus system are in fact subjected to the diagnosis. On the one hand, the bus participant itself may be subjected to the diagnosis. On the other hand, it may also be provided that a data transmission channel between the distributor device and the bus participant is subjected to the diagnosis, i.e. the at least one port connection itself and/or an electric bus line coupling this port connection with the bus participant. As a function of the situation and according to the requirements, the diagnosis can therefore be carried out with respect to different components of the bus system.

Various embodiments may be provided also with respect to the distributor device.

In one embodiment, it is provided that the bus system comprises at least one control device of the vehicle as a distributor device, to whose port connections function components or function devices of the vehicle are connected as bus participants. Such a control device may, for example be a central control device (head unit) of the vehicle, which is used for triggering the various different function components, as for example, a navigation system, a display, a radio unit, an audio system, a telephone system and the like. However, a control device may also be a camera control device, which is used for triggering at least one camera of the vehicle and/or for processing image data of the camera. The at least one camera then represents a function component of the vehicle. In this embodiment, a diagnosis of function components of the vehicle is therefore permitted, particularly that of sensors and/or actuators.

In addition or as an alternative, it may be provided that the bus system comprises a central gateway as a distributor device, to whose port connections control devices of the vehicle are connected as bus participants. This embodiment, in turn, permits a diagnosis of the control devices themselves because here the central gateway takes over the function of a diagnostic device, by which a diagnosis can be carried out with respect to the control devices.

It was found to be particularly advantageous for the bus system to have a central evaluation device which is designed for storing and evaluating the diagnostic data. The at least one distributor device is then designed for transmitting the provided diagnostic data to the central evaluation device. The diagnostic data can thereby be centrally stored and evaluated in the evaluation device, which permits a monitoring of the diagnostic data for an extended period of time during the operation of the vehicle. By way of such a long-term "monitoring", a prediction of faults in the bus system, for example, becomes possible. If faults are detected ahead of time, for example, corresponding fault reports can be emitted early and the faults can thereby be eliminated early.

The central evaluation device is preferably integrated in the central gateway. Because the bus participants—particularly the control devices and/or the function device—can always be reached by the central gateway directly, or indirectly by way of distributor devices or switches, or—as required—can also reach the gateway themselves, the central gateway can advantageously be used as the central evaluation device for evaluating and managing the diagnostic data. All diagnostic data are therefore known at the central point of the bus system and can therefore, for example, also be compared with one another.

It may also be provided that the central evaluation device has an interface, particularly an Ethernet interface, to which an external diagnostic device can be connected. By way of this interface, the diagnostic data and/or information obtained therefrom can be read out by the external diagnostic device. The communication with the external diagnostic device is therefore preferably limited to the transmitting of diagnostic data and/or of the information obtained therefrom, without requiring that an additional diagnosis be carried out by the diagnostic device itself.

With respect to carrying out the diagnosis by the at least one distributor device, the following embodiments may be provided.

Within the scope of carrying out the diagnosis, the at least one distributor device can examine the at least one port connection and/or a bus line connected to this port connection with respect to a physical fault, particularly an electric short circuit and/or an electric idling or an interruption. Such a fault can be recognized, for example, by a corresponding monitoring of a physical signal, such as an electric voltage at the port connection and/or of the electric current. Such a port-specific detection of physical faults ensures a secure operation of the bus system, because, in the event of a physical fault, the respective port connection can be actively switched off by the distributor device or be disconnected from a voltage source.

Within the scope of carrying out the diagnosis, the at least one distributor device can also determine the number of rejected data packets (data frames). Data that include information concerning the number of rejected data packets can then be provided as diagnostic data. The number of rejected data packets can be determined in the so-called MAC layer (media access control) of the distributor device and allows unambiguous conclusions concerning transmission faults of the data transmission channel between the distributor device and the respective bus participant.

As an alternative or in addition, within the scope of carrying out the diagnosis, the at least one distributor device can also determine a signal quality and/or a mean square error (MSE) of a physical signal at the at least one port connection, particularly of the voltage and/or of the current. In this case, the MSE is determined particularly from a gap between the expected signal level (voltage level) and the actually present signal level. On the basis of the MSE, the signal quality can be determined in turn. The determination of the signal quality and/or of the MSE also permits an unambiguous conclusion on the quality of the data transmission channel. Specifically, by use of the signal quality—assuming there is a defined interference, for example, a white noise—the so-called bit error rate can be determined, which represents a direct measurement of the quality of the data transmission channel. As a result, faulty or degraded bus lines and therefore an insufficient transmission quality can be detected. In addition, by monitoring the signal quality for an extended time period, it becomes possible to detect an aging or degrading bus line ahead of time within the scope of a forecast. If such a fault is detected ahead of time, a corresponding warning message can be issued by which the driver is informed early concerning a possible fault.

As mentioned above, it can be provided in an embodiment that the at least one distributor device determines a bit error rate as a function of the detected signal quality. Data that include information on the bit error rate can then be provided as diagnostic data. The bit error rate can thereby be monitored by way of the time.

As an alternative or in addition, data that include information concerning the signal quality and/or the MSE can also be provided as diagnostic data.

As a function of the signal quality, the at least one distributor device can also draw a conclusion concerning a technical state of the port connection and/or the bus line connected to this port connection. When, for example, insufficient signal quality is detected for a pre-determined duration, this directly indicates an insufficient technical state of the port connection and/or the bus line.

It can optionally also be provided in an embodiment that the diagnosis is carried out by means of the data (application data) received during the operation by the distributor device from the at least one bus participant. As required, application faults and thereby, for example, so-called "babbling idiots" can be detected. As a result, it in turn becomes possible to switch off those port connections to which such faulty bus participants are connected. These bus participants can thereby be disconnected from the remaining bus system in order to avoid an excessive bus load on the bus system.

Thus, within the scope of carrying out the diagnosis, a momentary bus load can be determined at the at least one port connection. The at least one distributor device may be designed to draw a conclusion, as a function of the momentary bus load, that there is an operating fault or an application fault of the bus participant connected to the port connection. When such a "babbling idiot" is detected, the assigned port connection can be switched off, the bus participant can be disconnected from the network, and the bus system can thereby be reliably protected.

On the whole, within the scope of the diagnosis, diagnostic data can be provided which describe the following faults:

Short-circuits and interruptions of the transmission line, i.e. physical bus faults, insufficient transmission quality by faulty or degraded lines, an aging or degrading line—these can be detected and also forecast, frames rejected by MAC because of transmission faults, changes in the network, i.e. lacking or newly added nodes, and/or application faults by which an increased bus load is caused.

Furthermore, the effects of application faults on the network can be limited in that the data transmission of faulty nodes is stopped. In addition, the diagnostic functions generally have to be implemented in switch nodes, root nodes and regular application nodes. In this case, the essential diagnosis and fault treatment is limited to infrastructure components (root nodes and switch nodes) and therefore have no applicative influence.

Long-term monitoring and integrated supervision of the network utilization in the service life cycle of the vehicle can therefore be carried out for the first time. Switch-off scenarios and fault corrections can be implemented on this basis. For example, the faulty "sick" part of the vehicle can thereby be cleared away. In addition, for the first time, a forecasting of degrading components (wire harness) can take place for the first time by way of a long-term monitoring of CRC errors and of the signal quality.

A method according to the invention is used for operating an Ethernet bus system in a vehicle, whereby at least one distributor device communicates with a multiplicity of bus participants, which are connected to respective port connections of the distributor device and, by way of the respectively assigned port connection, during the operation of the bus system, transmit data to the distributor device and/or receive data from the distributor device. By way of the at least one distributor device, a diagnosis with respect to at least one of the port connections is carried out during the operation of the bus system, and in the process, diagnostic data are provided with respect to the at least one port connection.

The preferred embodiments and their advantages introduced with respect to the vehicle according to the invention correspondingly apply to the method according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram illustrating a vehicle having a bus system according to an embodiment of the invention.

DETAILED DESCRIPTION OF THE DRAWING

A vehicle 1, such as a passenger car, schematically illustrated in the FIGURE, includes a bus system 2 that is constructed as an Ethernet bus system or as a LAN. The bus system 2 has a central gateway 3, which has several port connections 4, 5, 6, 7. The port connections 4, 5, 6, 7 are physical LAN ports of the central gateway 3. The central gateway 3 may have an additional interface 8, particularly an Ethernet interface, to which a vehicle-external diagnostic device can be connected. Furthermore, a central evaluation device 9, such as a digital signal processor, is integrated in the central gateway 3.

The bus system 2 also includes several control devices of the vehicle 1, specifically, in the embodiment, a first control device 10, a second control device 11 as well as a third control device 12.

The first control device 10 is connected by means of its port 13 by way of a bus line 14 to the port connection 4 of the central gateway 3. The second control device 11 is connected by means of its port 15 by way of a bus line 16 to the port connection 5. The third control device 12, in turn, is linked by means of its port 17 by way of a bus line 18 to the port connection 7 of the central gateway 3 with respect to communication.

The first control device 10 may, for example, be a central control device (head unit) of the vehicle 1. The second control device 11 may, for example, be a camera control device. The third control device 12 may, for example, be an airbag control device or a driver assistance control device, which processes, for example, radar data or object data of a radar sensor.

The control devices 10, 11, 12 themselves also have port connections, to which function components of the vehicle 1 are connected. Specifically, the first control device 10 has three such port connections 19, 20, 21. These port connections 19, 20, 21 are physical LAN ports. One function component 22 respectively is connected to these port connections 19, 20, 21 by way of its assigned port 23 as well as by way of a bus line 24. The function components 22 may, for example, include the following function devices of the vehicle 1: an infotainment system, an antenna module, an instrument cluster and the like.

Correspondingly, the second control device 11 also has several port connections 25, 26 27, 28, to which respective function components 29 of the vehicle 1 are connected by way of respective ports 30 and respective bus lines 31. The function components 29 may, for example, be cameras, which are triggered by way of the control device 11.

In a corresponding manner, the third control device 12 may also have a port connection 32, to which a function component 33 is connected by way of its port 34 and an assigned bus line 35 with respect to communication. The function component 33 may, for example, be an airbag sensor and/or an airbag actuator or a control device having a radar sensor for detecting and preprocessing radar data.

The central gateway 3 as well as the control devices 10, 11, 12 represent distributor devices in the sense of the present invention and therefore each have the function of a switch. With respect to the central gateway 3, the control devices 10, 11, 12 also represent bus participants, which are connected directly to the central gateway. In addition, a function component 36 is also provided here as a bus participant which, by way of its port 37 is connected directly to the port connection 6 of the central gateway 3. The function component 36 may, for example, be a front camera.

The control devices 10, 11, 12 themselves also represent distributor devices to which the respective function components 22, 29, 33 are connected. Here, the function components 22, 29, 33 represent bus participants, which are linked to the bus system 2 by way of the respective distributor device 10, 11, 12.

The distributor devices, i.e. the central gateway 3 as well as the control devices 10, 11, 12 are now enabled by corresponding software to carry out a diagnosis with respect to each port connection 4, 5, 6, 7, 19, 20, 21, 25, 26, 27, 28, 32 during the operation of the bus system 2 and therefore during the operation of the vehicle. This diagnosis is basically carried out independently of the respective use or independently of the respective application and therefore takes place in the background. A diagnosis is therefore carried out with respect to each port connection 4 to 7, 19 to 21, 25 to 28 and 32 by the respective distributor device, during which at least one of the following functionalities can be provided:

The port connections 4 to 7, 19 to 21, 25 to 28 and/or the respective bus lines 14, 16, 18 24, 31, 35 can be examined. with respect to a physical fault, particularly an electric short-circuit and/or electric idling;

the central gateway 3 and the control devices 10, 11, 12 can, in each case, determine the number of rejected data packets for each port connection 4 to 7, 19 to 21, 25 to 28 and 32;

for each port connection 4 to 7, 19 to 21, 25 to 28 and 32, in each case, the signal quality of a physical signal can also be determined, particularly of the electric voltage and/or of the electric current—as a function of this signal quality, a bit error rate can then be determined and/or depending on signal quality, a conclusion can be drawn with respect to the technical state of the respective port connection 4 to 7, 19 to 21, 25 to 28 and 32 and/or the respective bus line 14, 16, 18, 24, 31, 35;

by way of the transmitted data, in each case, a momentary bus load can also be determined at the respective port connection 4 to 7, 19 to 21, 25 to 28 and 32. As a function of this bus load, application faults of the respective bus participants can be detected and, as required, so-called "babbling idiots" can be identified and disconnected or switched off.

The respective distributor device 3, 10, 11, 12 provides diagnostic data during the diagnosis and transmits these to the central evaluation device 9, in which the diagnostic data of all bus participants are centrally evaluated and stored. As required, these diagnostic data can then be accessed by way of the interface 8.

By way of the diagnostic data, a long-term monitoring or a supervision of the bus system can also be carried out for an extended time period. Switch-off scenarios and fault corrections can be carried out on this basis. For example, the faulty function components or bus participants can thereby be switched off and the remaining networking sector can thereby be protected. By means of the monitoring of the above-mentioned signal quality and/or the number of rejected data packets it is further possible to detect faulty components ahead of time and, as required, issue corresponding warning messages at an early point in time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an Ethernet bus system having at least one distributor device with multiple port connections to which one bus participant, respectively, is connected, wherein
   by way of an assigned port connection, the bus participant transmits data to the distributor device and/or receives data from the distributor device during operation of the Ethernet bus system,
   the distributor device carries out a diagnosis with respect to at least one of the multiple port connections and, in carrying out the diagnosis, provides diagnostic data with respect to the at least one of the multiple port connections to a central evaluation device that is integrated in the distributor device and that evaluates the diagnostic data, and
   no external diagnostic device is connected to the distributor device,
   wherein the central evaluation device that is integrated in the distributor device stores the diagnostic data in a central diagnostic memory and wherein the stored diagnostic data is accessible by way of an interface of the distributor device.

2. The vehicle according to claim 1, wherein the at least one distributor device is designed to diagnose:
   the at least one port connection,
   the bus participant connected to the at least one port connection, and/or
   an electric bus line coupling the bus participant with the port connection.

3. The vehicle according to claim 2, wherein
   the at least one distributor device is a vehicle control device to whose port connections function components of the vehicle are connected as the bus participants.

4. The vehicle according to claim 1, wherein
   the at least one distributor device is a vehicle control device to whose port connections function components of the vehicle are connected as the bus participants.

5. The vehicle according to claim 1, wherein the at least one distributor device is a central gateway of the Ethernet bus system to whose port connections the vehicle control devices are connected as bus participants.

6. The vehicle according to claim 3, wherein the at least one distributor device is a central gateway of the Ethernet bus system to whose port connections the vehicle control devices are connected as bus participants.

7. The vehicle according to claim 2, wherein
   the at least one distributor device is designed to examine, within a scope of the diagnosis, the at least one port connection and/or the electric bus line connected to the at least one port connection with respect to a physical fault.

8. The vehicle according to claim 7, wherein the physical fault is one or more of:
   an electric short circuit or an electric idling.

9. The vehicle according to claim 2, wherein
   the at least one distributor device is designed to determine, within a scope of the diagnosis, a number of rejected data packets, and
   the at least one distributor device provides data as the diagnostic data which includes information concerning the number of rejected data packets.

10. The vehicle according to claim 2, wherein
the at least one distributor device is designed to determine, within a scope of the diagnosis, one or more of a signal quality and a mean square error of a physical signal of the at least one port connection.

11. The vehicle according to claim 10, wherein the at least one distributor device is designed to:
   determine a bit error rate as a function of the signal quality and provide data as the diagnostic data which includes information concerning the bit error rate, and/or
   provide data as the diagnostic data which includes information concerning the mean square error of the physical signal and/or concerning the signal quality.

12. The vehicle according to claim 10, wherein
the at least one distributor device is designed to determine, as a function of the signal quality, a technical state of the port connection and/or of the electric bus line connected to the port connection.

13. The vehicle according to claim 1, wherein the at least one distributor device is designed to carry out the diagnosis via data received during the operation of the Ethernet bus system.

14. The vehicle according to claim 1, wherein
the at least one distributor device is designed to determine a momentary bus load at the at least one port connection, and
as a function of the momentary bus load, the at least one distributor device draws a conclusion with respect to an operating fault of the bus participant connected to the port connected.

15. The vehicle according to claim 1, wherein
the central evaluation device is a digital signal processor.

16. A method of operating an Ethernet bus system in a vehicle, wherein at least one distributor device communicates with multiple bus participants that are connected to respective port connections of the distributor device and, by way of a respectively assigned port connection transmit data to the distributor device and/or receive data from the distributor device during operation of the Ethernet bus system, wherein the method comprises the acts of:
   during the operation of the Ethernet bus system, diagnosing, via the at least one distributor device, at least one of the port connections;
   based on the diagnosing, providing diagnostic data concerning the at least one port connection to a central evaluation device that is integrated in the distributor device;
   evaluating the diagnostic data by the central evaluation device that is integrated in the distributor device; and
   storing the diagnostic data by the central evaluation device that is integrated in the distributor device in a central diagnostic memory, wherein the stored diagnostic data is accessible by way of an interface of the distributor device;
   wherein no external diagnostic device is connected to the distributor device.

17. The method according to claim 15, wherein
the central evaluation device is a digital signal processor.

* * * * *